United States Patent
Tischler

(10) Patent No.: US 7,643,624 B2
(45) Date of Patent: Jan. 5, 2010

(54) REMOTE LINE ACCESS FOR A MULTI-LINE RESIDENTIAL TELEPHONE

(75) Inventor: Ralph Tischler, Richmond (CA)

(73) Assignee: VTech Telecommunications Limited, Tai Po, New Territory (HK)

( * ) Notice: Subject to any disclaimer, the term of this patent is extended or adjusted under 35 U.S.C. 154(b) by 881 days.

(21) Appl. No.: 11/119,758

(22) Filed: May 3, 2005

(65) Prior Publication Data

US 2006/0251230 A1    Nov. 9, 2006

(51) Int. Cl.
H04M 1/00    (2006.01)
H04M 11/00    (2006.01)

(52) U.S. Cl. .................. 379/156; 379/93.03; 379/93.05; 379/165; 379/207.13

(58) Field of Classification Search .................. 379/156, 379/157, 158, 161, 167.01, 177, 199, 201.01, 379/202.01, 204.01, 205.01, 206.01, 207.06, 379/207.09, 207.11, 207.12, 93.02, 93.03, 379/93.05, 93.07, 165, 207.03
See application file for complete search history.

(56) References Cited

U.S. PATENT DOCUMENTS

| | | | | |
|---|---|---|---|---|
| 4,972,479 A | * | 11/1990 | Tobias et al. .................. 380/33 |
| 5,408,525 A | * | 4/1995 | Eldering .................. 379/162 |
| 5,452,347 A | * | 9/1995 | Iglehart et al. .................. 379/199 |
| 5,590,185 A | * | 12/1996 | Sandler et al. .................. 379/163 |
| 5,684,869 A | * | 11/1997 | Palumbo et al. .................. 379/182 |
| 6,208,713 B1 | * | 3/2001 | Rahrer et al. .................. 379/67.1 |

* cited by examiner

Primary Examiner—Binh K Tieu
(74) Attorney, Agent, or Firm—Paul, Hastings, Janofsky & Walker LLP

(57) ABSTRACT

A method for remote accessing a multi-line residential telephone system. Using a first remote telephone, a calling party dials a telephone number associated with a first telephone line of the multi-line residential telephone system. After a predetermined number of unanswered rings at the first telephone line of the multi-line telephone system, the multi-line telephone system prompts the calling party to input a code. After a successful verification of the code, the multi-line telephone system connects the first remote telephone with a second telephone line of the multi-line telephone system so that the calling party receives a dial tone over the second telephone line. The calling party then dials a terminating telephone number associated with a second remote telephone to establish communication with a called party of the second remote telephone.

20 Claims, 2 Drawing Sheets

REMOTE LINE ACCESS FOR A MULTI-LINE RESIDENTIAL TELEPHONE

BACKGROUND

1. Field of the Invention

The present invention relates in general to telephone communications devices. In particular, the invention relates to remote line access for a multi-line residential telephone.

2. Background of the Invention

A local telephone company typically provides services to a single line in subscriber's homes, leaving any extra lines unused. Individuals can request that service be provided to a second line so as to, for example, supply a separate phone line and distinct phone number in the home office or to provide different phone numbers for different members in the family. In recent years, the increased use of devices, such as fax machines and personal computer modem, that require telephone connectivity, has led to a further increase in the number of individuals requesting additional lines of telephone service. Accordingly, many homes are wired with two separate telephone lines. Some homes are even wired with as many as four separate telephone lines.

As multiple lines of telephone service are activated, multi-line telephone sets are then needed to access these multiple phone lines using a single telephone device. In a home application where there exist only two active lines, a dual-line telephone set is typically used by connecting the set to the two separate phone lines via two standard telephone cables. The user may then press buttons on the multi-line telephone set to select one line or the other line to make or receive a call. Many multi-line telephone sets also provide functionality to establish a conference connection state among two available lines and the user of the telephone set such that the user may establish a connection with both lines simultaneously. Thus by pressing buttons on the multi-line telephone set the user may switch between the two connections, either maintaining separate conversations or establishing a conference call whereby all three parties may converse together simultaneously across the two lines.

Multiple phone lines are even more commonplace in business environments where multiple lines are typically used to provide phone service to many locations within an organization. Depending on the size of the company, the number of lines could range from two to four lines in a single office location to hundreds or even thousands of lines that span multiple locations across a country or countries. Sophisticated private branch exchange (PBX) equipment is typically used to manage the routing of calls and other data within these large telephone communication systems. The PBX systems are often digital, complicated to configure and maintain, and expensive. Moreover, the PBX systems require central call routing hardware external to the telephone set. For these reasons, such systems are not well suited for residential applications.

In addition to enabling the making and receiving of multiple calls by multiple users of a commercial PBX system, such systems also often offer Direct Inward System Access ("DISA"). DISA is a service that allows users to dial into the PBX system from a telephone outside the system, and after entering an access code, to use the services of the PBX system remotely. Such a service offers many benefits to the user. Since some large companies operate their own private branch exchanges that span great distances, a user wishing to call a branch office across the country from a telephone not connected to the company's telephone system could dial into the system by making an inexpensive local call, and then access the DISA service to place the long-distance call to the branch office. Because DISA enables the user to place a call as if the user were physically calling from within the PBX system, the user incurs no long-distance telephone charges, and any long-distance charges that are incurred would be billed to the company number rather than the user.

While PBX systems are generally inappropriate for residential applications because of their complexity and cost, individuals would benefit from certain features provided by typical PBX systems. One such feature is DISA functionality. Residential users would benefit from being able to dial into one line and remotely access a second line to place calls that are billed to the user's residence rather than to the remote location. The user could then place long-distance calls from a remote location where such calls are either expensive or prohibited, and take advantage of the very low long-distance service rates typically provided to residential locations. Moreover, there exists a need to provide this service at significantly lower cost and lower technical complexity than is offered by PBX systems used today in business applications. As such, it is an object of this invention to provide a structure and means for remote line access for multi-line residential telephones that is inexpensive, easy to install and operate and allows users to utilize their home's multiple telephone lines from a remote location.

These and other objects of the present invention will become apparent to those of ordinary skill in the art in light of the present specifications, drawings and claims.

BRIEF SUMMARY OF THE INVENTION

One object of the present invention is to provide a multi-line telephone system through which a calling party can use a dialing tone of one telephone line of the multi-line telephone system to dial a desired telephone number from a remote telephone.

According to one embodiment of the present invention, a multi-line residential telephone system configured to communicate via a plurality of telephone lines comprises an internal conference connection module in communication with the plurality of telephone lines. When an incoming call initiated by a calling party using a first line of the plurality of telephone lines remains unanswered for a predetermined number of rings, the internal conference connection module connects the calling party to a second line of the plurality of telephone lines after verifying a code input by the calling party and the calling party receives a dial tone associated with the second line of the plurality of telephone lines.

Another object of the present invention is to provide a method for remotely accessing a multi-line telephone system so that a calling party can use a telephone service plan of the multi-line telephone system to make outgoing calls even thought the calling party is remote from the multi-line telephone system.

According to a second embodiment of the present invention, a method for making a telephone call comprises receiving, at a first line of a plurality of telephone lines associated with a telephone device, an incoming call initiated by a calling party, verifying the calling party is an authorized user of the telephone device; and connecting the incoming call with a second line of the plurality of telephone lines. Afterward, the calling party receives a dial tone associated with the second line of the plurality of telephone lines.

Another embodiment of the method of the present invention includes receiving an incoming call associated with a first telephone line of a multi-line telephone system through a remote telephone, prompting a calling party associated with the incoming call to provide a code, comparing the code with one or more predetermined codes stored in the multi-line telephone system, activating a conference connection module if the code corresponds to the first predetermined code, and connecting the first telephone line with a second telephone line of the plurality of telephone lines. Afterward, the calling party receives a dial tone associated with -the second line of the plurality of telephone lines and dials a terminating telephone number associated with another remote telephone through the dial tone of the second line.

A further embodiment of the method of the present invention also prompts the calling party to input a second code sequence to activate the conference connection module and a third code sequence to terminate a call to the desired telephone number and to re-establish a new dialing tone for the second telephone line.

DETAILED DESCRIPTION OF THE INVENTION

Figure 1:
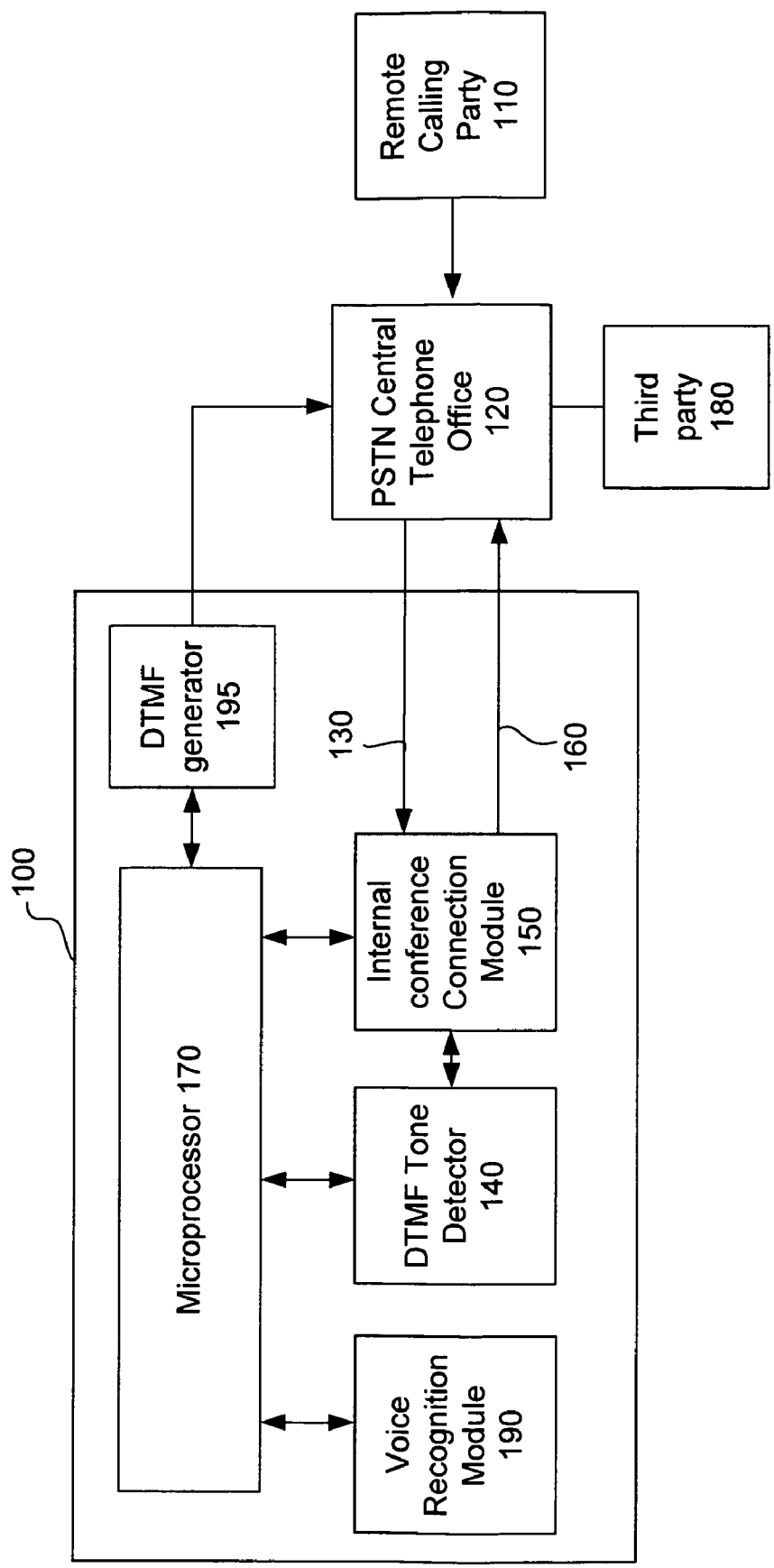
FIG. 1 is a block diagram of an embodiment of the invention.

While this invention is susceptible to embodiment in many different forms, there are shown in the drawings and will be described in detail herein specific embodiments. The present disclosure is to be considered as an exemplification of the principle of the invention intended merely to explain and illustrate the invention, and is not intended to limit the invention in any way to embodiments illustrated.

FIG. 1 depicts one exemplary embodiment of a remote line access for a multi-line residential telephone in accordance with the present invention. Multi-line telephone set 100 comprises internal conference connection module 150 that is shown coupled to telephone lines 130 and 160. According to the present invention, by use of internal conference connection module 150, multi-line telephone set 100 allows calling party 110 to call a telephone number associated with first telephone line (for example, first line 130) of telephone set 100 by using a remote telephone and to use second telephone line (for example, second line 160) of telephone set 100 to make outgoing calls using the service plan of telephone set 100. Preferably, the remote telephone can be another telephone set, a cellular telephone or a public telephone. Further, the call is connected to telephone set 100 through Public Switched Telephone Network (PSTN) central telephone office 120.

Telephone set 100 further includes an microprocessor 170 and Dual-Tone Multiple Frequency (DTMF) tone detector 140 coupled to internal conference connection module 150. In accordance with a preferred embodiment of present invention, after a predetermined number of unanswered rings, microprocessor 170 answers the call by opening a connection on line 130 and automatically couples line 130 to internal DTMF tone detector 140 via a DTMF Conference Connection (not shown). Microprocessor 170 then plays to calling party 110 over line 130 a recorded welcome message that prompts the calling party to enter a predetermined personal identification number (PIN) via dialing DTMF tones to gain remote access to the telephone set 100 system. Instead of playing the recorded welcome message, in another embodiment, microprocessor 170 generates a short noticeable sound, such as a beep sound, that prompts calling party 110 to enter the PIN.

Calling party 110 enters the requisite PIN using the remote telephone set touch-tone keypad. The resulting DTMF signals are received and decoded by DTMF Tone Detector 140, after which caller 110 may be required to enter a further predetermined DTMF code to enable internal conference connection module 150. In another preferred embodiment, calling party 110 can also enter the requisite PIN using a speakerphone of the remote telephone set to generate audio signals. In this case, voice recognition module 190 of telephone set system 100 receives and decodes audio signals from calling party 110 to enable internal conference connection module 150. At the time, calling party 120 connects to second line 160 through first line 130 by means of Internal Conference Connection module 150. Internal Conference Connection module 150 acts as a switch to establish a conference connection state between lines 130 and 160. A software program and microprocessor 170 controls telephone set 100 operations including Internal Conference Connection module 150 operation and microprocessor 170 accepts command inputs from DTMF tone detector 140 as well as from front-panel buttons or switches of telephone set 100.

There are two ways in the present invention to enable calling party 110 to complete a call to third party 180. In one embodiment, upon the successful completion of this sequence, calling party 110 is connected via first line 130 to second line 160 and receives a dial tone on second line 160 from PSTN 120. Calling party 100 may then commence DTMF dialing into the PSTN to connect to third party 180 via an internal conference connection. In an another embodiment, telephone system 100 may include a DTMF generator 195. When calling party 110 dials a telephone number corresponding to third party 180 through second line 160, DTMF tone detector 140 receives and decodes the telephone number. Microprocessor 170 then enables DTMF generator 195 to dial the telephone number and connects second line 160 with third party 180. At the time, calling party 160 is communicating with third party 180 using a service plan of line 160.

Figure 2:
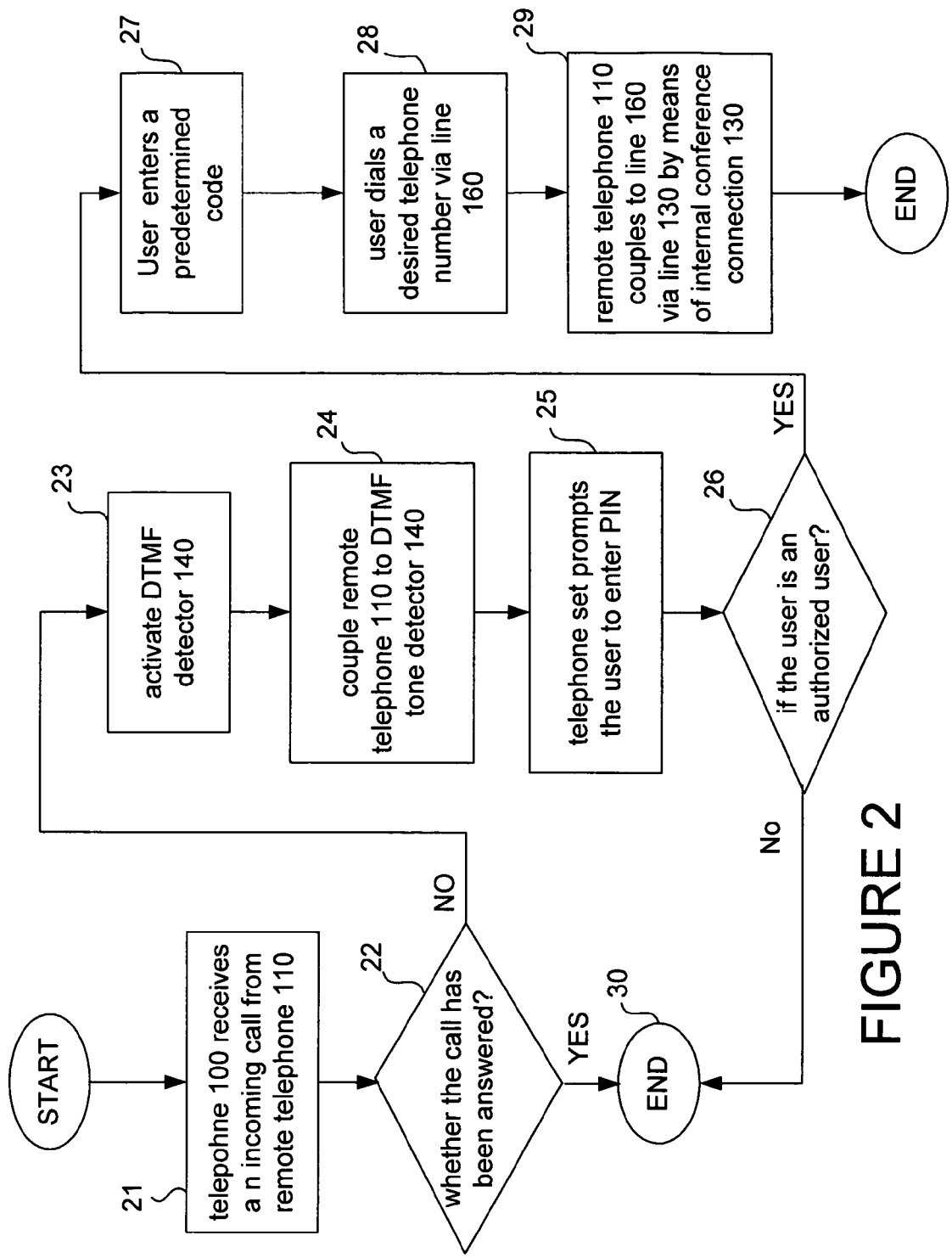
FIG. 2 is a flow chart showing a method for remotely accessing a multi-line telephone system in accordance with the present invention.

An exemplary method of remote line access for a multi-line residential telephone in accordance with the present invention is depicted in FIG. 2.

At step 21, telephone set 100 receives an incoming call associated with first line 130 from user 110 through a first remote telephone.

At step 22, if the incoming call has been answered, microprocessor 170 connects first line 130 with first remote telephone 110 through PSTN. The remote line access process ends, as shown at step 30. If, however, the incoming call has not been answered after a predetermined number of rings, microprocessor 170 answers the call by activating DTMF tone detector 140, as shown at step 23. At step 24, microprocessor further couples first line 130 with DTMF tone detector 140.

At step 25, microprocessor 170 plays a pre-recorded message or just generates a beep sound to user 110 prompting user 110 to enter his/her password.

At step 26, user 110 enters his/her password, which in turn is encoded in a form of DTMF signals. The DTMF signals are received and decoded by DTMF tone detector 140 for the purpose of authorization. If user 110 is not an authorized user, the process ends, as shown at step 30. If user 110 is an authorized user, microprocessor plays a further message comprising a number of choices so that user 110 selects one selection. As described above, the microprocessor can just generate a short noticeable sound, such as a beep sound, to prompt the user to make the selection.

At step 27, user 110 enters a selection. In the preferred embodiment, user 110 selects entering an internal conference connection function and optionally, a predetermined authorization code to initiate internal conference connection 150.

After internal conference connection module 150 is activated, at step 28, calling party 110 is connected to second line 160 through line 130. At the time, calling party 110 receives dialing tones from second line 160.

At step 29, user 110 then dials a telephone number associated with a second remote telephone that he/she wishes to connect by using the dialing tone of second line 160 through PSTN 120 and the service plan of second line 160. As described above, by doing so, user 110 can take the advantage of making a cheaper telephone call by using the service plan of line 160.

In an alternative embodiment, at step 29, when user 110 dials the telephone number associated with a second remote telephone (such as third party 180 of FIG. 1), DTMF tone detector 140 receives and decodes the telephone number. Next, microprocessor 170 enables DTMF generator 195 to dial the telephone number and connect second line 160 with the second remote telephone.

In accordance with the preferred embodiment of the present invention, at any time while the conference connection is established between first and second lines 130 and 160, calling party 110 may enter yet a further predetermined DTMF sequence that will act to terminate the telephone connection on second line 160 and re-establish a dial tone from PSTN 120. In this manner the user may make a number of calls via second line 160 without the need to break the connection with first line 130.

When having finished making remote calls via telephone set 100, calling party 110 may disconnect from 100 by either entering yet another further predetermined DTMF sequence that instructs 100 to disconnect itself from the first line 130 or by terminating the call directly at the remote telephone set.

Multi-line telephone set 100 is shown with two lines, 130 and 160, however may in practice be a multi-line unit with more than two lines as well as be used in residential, commercial or other environments without departing from the invention. Furthermore, is understood that any available line in telephone set 100 may be dialed directly and a subsequent connection be made to any other available line or lines in telephone set 100 through the method and embodiment described herein without departing from the invention.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A multi-line residential telephone system configured to communicate via a plurality of telephone lines, comprising:
   a plurality of residential telephone lines serviced by a single network;
   an internal conference connection module in communication with the plurality of telephone lines,
   wherein when an incoming call initiated by a calling party using a first line of the plurality of telephone lines remains unanswered for a predetermined number of rings, the internal conference connection module connects the calling party to a second line of the plurality of telephone lines,
   whereby the calling party receives a dial tone associated with the second line of the plurality of telephone lines.

2. The system of claim 1, further comprising a microprocessor coupled to the internal conference connection module, wherein the microprocessor is configured to solicit a code from the calling party before connecting the calling party to the second line of the plurality of telephone lines.

3. The system of claim 2, wherein the microprocessor is configured to compare a code received from the calling party with one or more pre-determined codes.

4. The system of claim 2, further comprising a dual-tone multiple frequency (DTMF) detector coupled to the internal conference connection module and the microprocessor.

5. The system of claim 2, further comprising a DTMF detector coupled to the plurality of telephone lines.

6. The system of claim 4, wherein the microprocessor is configured to solicit a code from the calling party before connecting the calling party to the second line of the plurality of telephone lines, wherein the code is associated with a DTMF signal.

7. The system of claim 2, further comprising a voice recognition module coupled to the internal conference connection module and the microprocessor.

8. The system of claim 7, wherein the microprocessor is configured to solicit a code from the calling party before connecting the calling party to the second line of the plurality of telephone lines, wherein the code is associated with a voice of the calling party.

9. A method for making a telephone call, comprising:
   receiving, at a first line of a plurality of residential telephone lines associated with a telephone device, an incoming call initiated by a calling party, the plurality of telephone lines being serviced by a single network;
   verifying the calling party is an authorized user of the telephone device; and
   connecting the incoming call with a second line of the plurality of telephone lines,
   whereby the calling party receives a dial tone associated with the second line of the plurality of telephone lines.

10. The method of claim 9, further comprising prompting the calling party to provide a code prior to the verifying the calling party is an authorized user of the telephone device.

11. The method of claim 10, wherein the code is a DTMF signal.

12. The method of claim 10, wherein the code is a speech segment uttered by the calling party.

13. The method of claim 10, further comprising comparing the code with a first predetermined code stored in the telephone device.

14. A method for making a telephone call, comprising:
   receiving an incoming call associated with a first telephone line of a multi-line residential telephone system through a first remote telephone, the multi-line residential telephone system having a plurality of residential telephone lines that are serviced by a single network;

prompting a calling party associated with the incoming call to provide a code;

comparing the code with one or more predetermined codes stored in the multi-line telephone system;

activating a conference connection module if the code corresponds to a first predetermined code; and connecting the first telephone line with a second telephone line of the plurality of telephone lines, whereby the calling party receives a dial tone associated with the second line of the plurality of telephone lines.

15. The method of claim 14, wherein the prompting comprises playing an announcement to solicit the calling party to input the code.

16. The method of claim 14, wherein the prompting comprises generating a noticeable sound to solicit the calling party to input the code.

17. The method of claim 14, wherein the prompting comprises presenting the calling party with a function menu.

18. The method of claim 14, further comprising:

receiving a terminating telephone number corresponding to a second remote telephone via the second telephone line; and connecting the calling party with a called party associated with the terminating telephone number via the second telephone line.

19. The method of claim 18, further comprising:

receiving the terminating telephone number via a DTMF detector;

dialing the terminating telephone number via an internal DTMF generator; and connecting the second remote telephone with the second telephone line.

20. The method of claim 14, further comprising:

receiving a second code from the calling party;

verifying the second code is one of the one or more predetermined codes; and disconnecting from the second telephone line.

* * * * *